March 9, 1926.  
A. DZIEWAS  
1,576,434

METHOD AND MEANS FOR LUTING MOLDS

Filed April 1, 1925

INVENTOR  
August Dziewas  
BY  
HIS ATTORNEY

Patented Mar. 9, 1926.

1,576,434

UNITED STATES PATENT OFFICE.

AUGUST DZIEWAS, OF TEMPELHOF, NEAR BERLIN, GERMANY, ASSIGNOR TO METAL & THERMIT CORPORATION, OF CARTERET, NEW JERSEY, A CORPORATION OF NEW JERSEY.

METHOD AND MEANS FOR LUTING MOLDS.

Application filed April 1, 1925. Serial No. 19,880.

*To all whom it may concern:*

Be it known that I, AUGUST DZIEWAS, a citizen of the German Republic, and a resident of Tempelhof, near Berlin, German Republic, have invented certain new and useful Improvements in Methods and Means for Luting Molds; and I do hereby declare the following to be a full, clear, and exact description of the invention, such as will enable others skilled in the art to which it appertains to make and use the same.

The invention relates to a method of and means for luting the joints of molds employed in effecting aluminothermic welding of rails, girders and the like, the luting being effected by providing the mating edges of coordinate mold box sections, which edges conform to and engage the parts to be welded, with channels into which a plastic sealing or luting material is injected, thereby sealing the joints between the elements of the mold and the parts to be welded to prevent the escape of the highly fluid molten metal through the mold joints.

A typical form of mold box, involving the structural features to carry out the novel method, is illustrated in the accompanying drawings, in which:—

Figure 1:
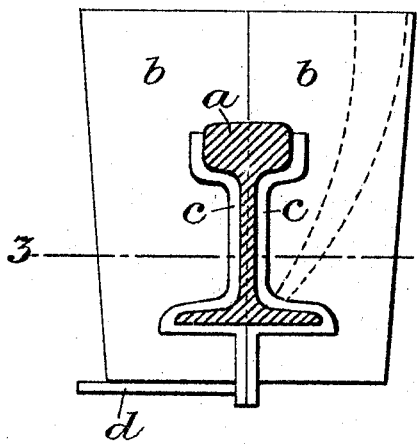
Fig. 1 is a vertical front elevation of a two-part mold applied to the rail sections.
Figure 2:
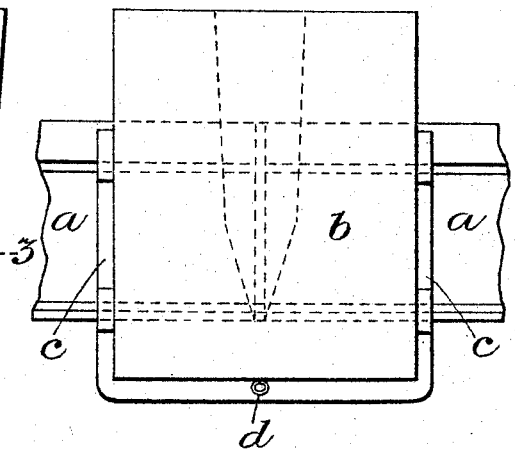
Fig. 2 is a side elevation of the same.
Figure 3:
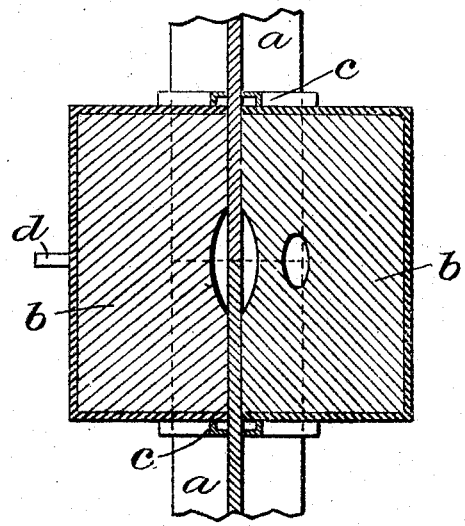
Fig. 3 is a horizontal section on the line 3—3 of Fig. 1.

In the usual practice of welding the joints of rails, girders and the like by the aluminothermic process, the ends of the rails or other members to be joined are enclosed in a mold box or flask, usually comprising two coordinate sections, the mating edges of the box sections being excised or recessed to conform to and engage the parts to be welded, and the mold proper comprising a filling of sand or similar refractory material applied to the mold box sections to provide the usual mold cavity about the rail ends, which cavity receives the superheated and highly fluid metal to effect the welded joint. In order to prevent the molten metal from leaking through the joints or cracks between the parts of the mold and between the surfaces of the rails and the mold box, it is necessary to seal or lute the joints. Various luting modes and means have been suggested and employed, but have been found to be either unsatisfactory because of the liability of the luting material breaking away or, on the other hand, have been practically prohibitive because of the time, labor and expense involved in the application of the luting means to the molds. The present invention is designed to obviate the objections inherent in the former luting methods and devices and to provide for a simple and efficient luting of molds of this character that may be applied with a minimum of labor and expense and that will insure an effective sealing of the joints between the mold box sections and the engaging surfaces of the rails or other elements to be welded.

Referring to the drawings, which illustrate a flask or mold box for effecting the alumino-thermic welding of the ends of two ordinary T-head rails, $a$—$a$ indicate the rail sections, which are enclosed in the coordinate mold box or flask sections $b$—$b$, the mating edges of which latter where they engage the lateral and bottom sections of the rails being excised or cut away to conform to the contour of the rails. The mating edges of the box sections, on both ends and bottom, are provided with channels $c$, which may be conveniently formed by angle iron sections shaped to conform generally to the contour of the mating edges of the mold box sections, one edge of each angle iron section engaging the wall of the corresponding mold box section and the other edge of the angle iron section engaging the surface of the adjacent rail, the corresponding edges of the angle iron sections below the rail and on the bottom of the mold box sections engaging each other. The channels thus formed extend partially about the respective rail ends and over the joint between the mold box sections and the lower parts of the ends and bottoms of said sections. Communicating with the channels thus formed and preferably with the channel section at the bottom, is a pipe $d$, adapted to be connected to a pump or other pressure means for forcing a suitable plastic luting material into the channels to fill the same and also to fill any cracks or interstices in the mating surfaces of the mold proper, which may be in communication with the channels, thereby preventing the escape of any of the highly molten metal during the welding operation. Obviously, if desired, the luting material may be delivered to the channels at several points, but ordinarily a single supply pipe $d$, preferably in the location indicated, will prove effective.

The channel forming angle irons or sections may be formed independently of the mold box sections and clamped to the latter, or may be permanently attached to the respective mold box sections, as by electric welding or equivalent operations, or may be formed as integral elements of the mold box sections, when the latter are made of castings or stampings. Obviously also, when the mold box sections are made of metal castings having walls of material thickness, the channels may be formed directly in the mating edges of the walls of the respective sections. Inasmuch as the channels are designed to retain the plastic luting or sealing material, which will either set up promptly or is of such character that it will not be forced out of the channels by any ordinary pressures developed in the welding operation, it is not necessary to provide especially tight joints between the walls of the channel defining elements and the rail surfaces which they engage, or between the mating edges of the channel forming elements, as the plastic material would necessarily seal any small opening that might exist between the mutually coacting surfaces. A suitable and typical plastic luting material is for instance moist loam.

What I claim is:

1. A mold box for use in alumino-thermic welding of rails, girders and the like comprising coordinate box sections having their mating edges excised to conform to and engage the parts to be welded, and having channels adjacent and conforming to the excised edges and the mating edges of the box sections to receive a plastic luting material to seal the mold joints.

2. A mold box for use in alumino-thermic welding of rails, girders and the like comprising coordinate box sections having their mating edges excised to conform to and engage the parts to be welded, and rectangular flanges associated with the box sections adjacent to and conforming to said edges, said flanges forming channels to receive a plastic luting material to seal the mold joints.

3. The method of luting molds of the character set forth in claim 1, which comprises forcing a plastic luting material into said channels to fill the latter.

In testimony whereof I affix my signature.

AUGUST DZIEWAS.